US010682673B1

(12) United States Patent
Laurent et al.

(10) Patent No.: US 10,682,673 B1
(45) Date of Patent: Jun. 16, 2020

(54) CARTRIDGE, AN ORAL CARE APPLIANCE AND METHODS TO OPERATE THE ORAL CARE APPLIANCE

(71) Applicant: Willo 32 SAS, Limoges (FR)

(72) Inventors: Alexandre Georges Gabriel Laurent, Brooklyn, NY (US); Pierre Jules Hercule Cazeneuve, Saint-Cloud (FR)

(73) Assignee: Willo 32 SAS, Limoges (FR)

( * ) Notice: Subject to any disclaimer, the term of this patent is extended or adjusted under 35 U.S.C. 154(b) by 0 days.

(21) Appl. No.: 16/270,404

(22) Filed: Feb. 7, 2019

(51) Int. Cl.
| | |
|---|---|
| *B08B 3/04* | (2006.01) |
| *A46B 11/00* | (2006.01) |
| *A46B 15/00* | (2006.01) |
| *B65D 85/00* | (2006.01) |
| *G06K 7/10* | (2006.01) |
| *G05B 15/02* | (2006.01) |
| *G06K 19/07* | (2006.01) |
| *A61C 17/22* | (2006.01) |

(52) U.S. Cl.
CPC ............ *B08B 3/04* (2013.01); *A46B 11/0065* (2013.01); *A46B 15/0008* (2013.01); *A46B 15/0038* (2013.01); *B65D 85/70* (2013.01); *G05B 15/02* (2013.01); *G06K 7/10297* (2013.01); *G06K 19/0723* (2013.01); *A46B 2200/1066* (2013.01); *A61C 17/221* (2013.01); *A61C 2204/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,241,412 | B1 * | 6/2001 | Spies | A46B 11/002 |
| | | | | 206/532 |
| 6,685,375 | B1 * | 2/2004 | Crocker | A46B 7/04 |
| | | | | 401/176 |
| 7,082,638 | B2 | 8/2006 | Koh | |
| 7,537,451 | B1 | 5/2009 | Ramnarine | |
| 8,356,374 | B2 * | 1/2013 | Tybinkowski | A61C 17/222 |
| | | | | 15/29 |
| 8,448,282 | B2 | 5/2013 | Stapelbroek | |
| 8,617,090 | B2 | 12/2013 | Fougere | |
| 8,635,731 | B2 | 1/2014 | Garner | |
| 8,667,634 | B2 | 3/2014 | Steur | |
| 8,745,802 | B2 | 6/2014 | Steur | |
| 8,863,346 | B2 | 10/2014 | Headstrom | |
| 8,978,189 | B1 | 3/2015 | Sexton | |

(Continued)

FOREIGN PATENT DOCUMENTS

| | | | |
|---|---|---|---|
| EP | 2654609 B1 | 3/2018 | |
| EP | 2654611 B1 | 4/2018 | |

(Continued)

OTHER PUBLICATIONS

International Search Report and Written Opinion from International Application No. PCT/IB2020/050709 dated Apr. 30, 2020, 11 pages.

*Primary Examiner* — Kidest Bahta
(74) *Attorney, Agent, or Firm* — Daylight Law, P.C.

(57) ABSTRACT

A cartridge and method to authorize and adjust the operation of an oral care appliance are disclosed. The oral care appliance along with the cartridge may be used for cleaning, whitening, removing plaque, or in other general oral care applications for providing oral care hygiene.

26 Claims, 5 Drawing Sheets

(56) References Cited

U.S. PATENT DOCUMENTS

| | | | |
|---|---|---|---|
| 8,990,992 B2 | 3/2015 | Stapelbroek | |
| 9,084,655 B2 | 7/2015 | Sahoo | |
| 9,277,980 B2 | 3/2016 | Leveling | |
| 9,308,065 B2 | 4/2016 | Steiner | |
| 9,504,542 B2 | 11/2016 | De Gentile | |
| 9,526,597 B2 | 12/2016 | Steur | |
| 9,636,195 B2 | 5/2017 | Wolpo | |
| 9,636,197 B2 | 5/2017 | Khangura | |
| 9,668,840 B2 | 6/2017 | Miller | |
| 9,907,633 B2 | 3/2018 | Wolpo | |
| 2005/0272001 A1* | 12/2005 | Blain | A61C 1/0061 433/80 |
| 2007/0184404 A1 | 8/2007 | Johnki | |
| 2008/0109973 A1* | 5/2008 | Farrell | A46B 7/04 15/4 |
| 2010/0275394 A1* | 11/2010 | Kemp | A61C 17/20 15/22.1 |
| 2011/0314623 A1* | 12/2011 | Jimenez | A46B 11/0024 15/167.1 |
| 2016/0113745 A1 | 4/2016 | Golub | |
| 2016/0135581 A1 | 5/2016 | Pai | |
| 2016/0206415 A1 | 7/2016 | Kraft | |
| 2016/0270892 A1 | 9/2016 | Yoo | |
| 2016/0331110 A1* | 11/2016 | Kolb | A46B 11/0024 |
| 2017/0116665 A1* | 4/2017 | Alzahrani | G06Q 30/0641 |
| 2017/0367801 A1 | 12/2017 | Fitzgerald | |
| 2018/0000573 A1 | 1/2018 | Miller | |
| 2018/0177575 A1 | 6/2018 | Yoshida et al. | |
| 2018/0184795 A1* | 7/2018 | Pai | A46B 9/045 |
| 2018/0184857 A1* | 7/2018 | Pai | A46B 9/045 |

FOREIGN PATENT DOCUMENTS

| | | |
|---|---|---|
| JP | H114717 A | 1/1999 |
| WO | 2017061980 A1 | 4/2017 |
| WO | 2017146366 A1 | 8/2017 |
| WO | 2018160986 A1 | 9/2018 |

* cited by examiner

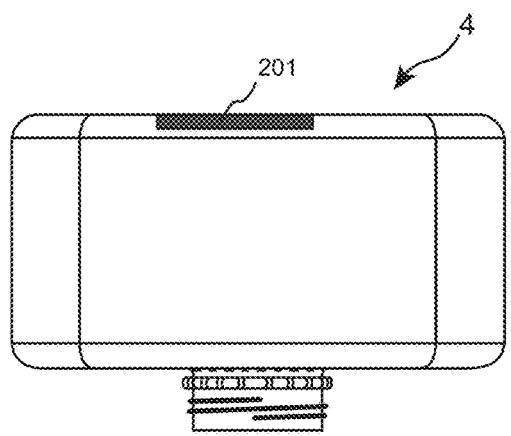
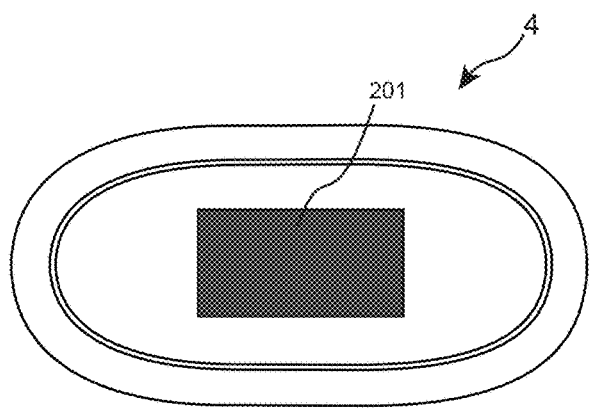
FIG. 1I  FIG. 1J
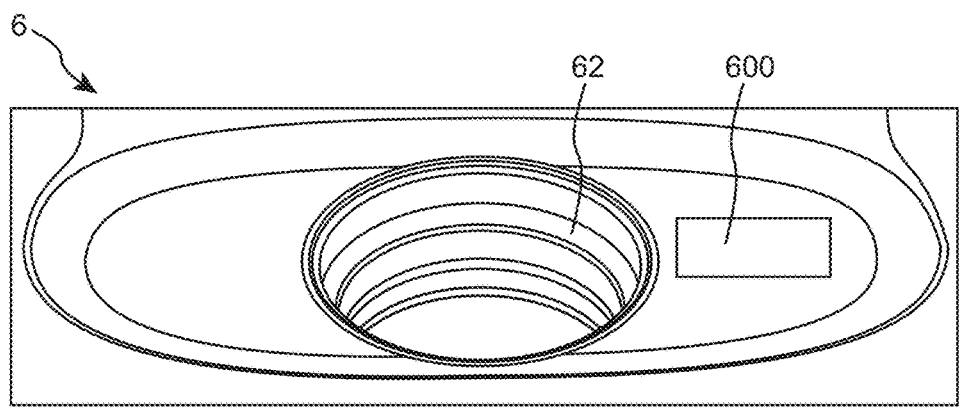
FIG. 2
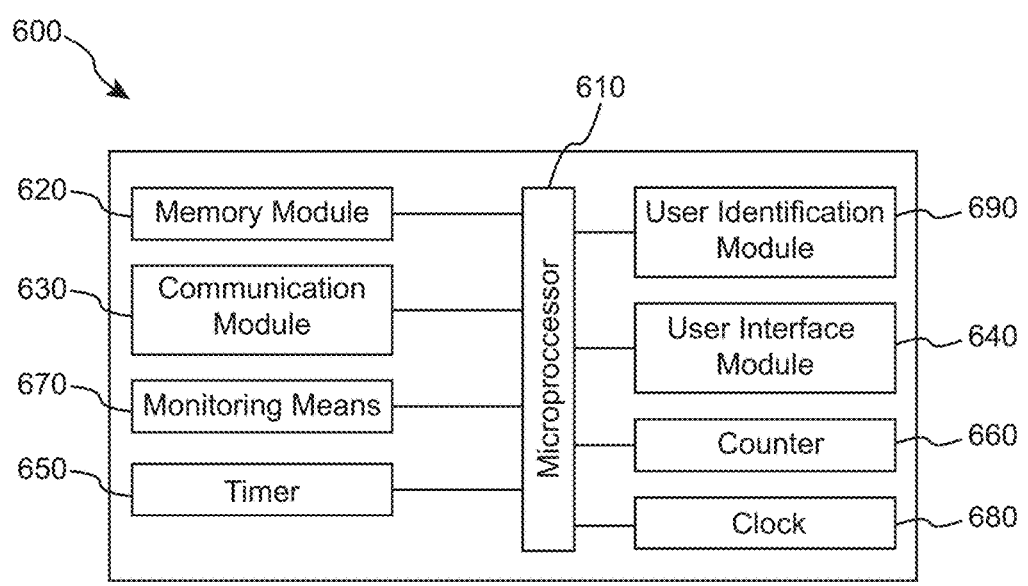
FIG. 3

CARTRIDGE, AN ORAL CARE APPLIANCE AND METHODS TO OPERATE THE ORAL CARE APPLIANCE

BACKGROUND OF THE INVENTION

Dental cleaning plays a significant role in impacting the overall health of an individual. Many oral care appliances have been developed over the years to achieve the purpose of oral hygiene. Dental cleaning devices such as electric toothbrushes, oral irrigators, dental water jets, electric flosses, etc., intend to provide cleaning results by eradicating the food remains, plaque, etc., from the spaces in between the teeth.

Many of these devices are portable devices and make use of an oral care solution for cleaning teeth. Although such appliances require less user intervention in their operations, and some of these are also suitable for people with disabilities or reduced mobility, or people on the move for whom it is difficult to use a traditional toothbrush, it is necessary to provide and improve existing oral care appliances for ensuring satisfactory cleaning results.

For instance, presently known oral care appliances that are meant to be used with dentifrice are usually not provided with integrated dentifrice dispensers. This implies that users must procure additional dentifrice dispensers if they want to achieve optimal oral care hygiene. Moreover, as the user may need to replace dentifrice dispenser or different users may require different dentifrices, it is desired to have oral care appliances with dentifrice dispensers which may be securely and easily engaged or disengaged with a handle or body portion of the oral care appliance. This also enables sharing of more costly components of the oral care appliance with multiple users. Additionally, it is also desirable to procure oral care appliances with detachable dentifrice dispensers that include means for preventing the use of inappropriate and/or counterfeit dispensers, and that further comprise means for adjusting certain operations of the oral care appliances based upon certain information related to the dispensers.

SUMMARY OF THE INVENTION

Specific embodiments of the invention disclosed herein provide a cartridge and method(s) to authorize and adjust the operation(s) of an oral care appliance.

Specific embodiments of the invention aim to address existing deficiencies in oral care devices by providing an oral care appliance, a cartridge for use with the oral care appliance and method(s) to authorize and adjust the operation(s) of the oral care appliance. The oral care appliance along with the cartridge may be used for cleaning, whitening, removing plaque, or in other general oral care applications for providing oral care hygiene. The cartridge may contain oral care agents used by the oral care appliance and made available to the oral care appliance by the cartridge when the cartridge is connected to the oral care appliance.

Specific embodiments of the invention provide a cartridge for an oral care appliance, the cartridge comprising an enclosure configured to form a detachable connection with the oral care appliance, an oral care agent contained in the cartridge, and a configuration module to store at least a specific information relating to the oral care agent in order to allow an adjustment of the operations of the oral care appliance in relation to said specific information. The enclosure can be shaped to form the detachable connection to the oral care appliance when the cartridge is connected to the oral care appliance.

According to specific embodiments of the invention, the configuration module comprises an NFC tag.

According to specific embodiments of the invention, the configuration module further includes a unique identifier to authenticate the cartridge and allow the operation of the oral care appliance upon authentication of the cartridge.

According to specific embodiments of the invention, the specific information comprises at least one of type, viscosity, flavour, colour, composition, concentration, recommended dosage, function, mixing parameters, or expiry date of the oral care agent.

According to specific embodiments of the invention, the specific information comprises at least one of injection time, pressure thresholds, number of contractions/relaxations, number of injections or injection volume.

According to specific embodiments of the invention, the specific information is used to adapt a brushing cycle of the oral care appliance.

According to specific embodiments of the invention, the oral care agent can be selected from one or more of a liquid, solid, powder, gel, fluid, or a combination thereof.

According to a specific embodiment of the invention, the cleaning agent referred to herein could be: a polishing agent such as an inert abrasive; a cleaning agent such as fluoride, activated charcoal, or a fluoride-free antibacterial composition; a halitosis treatment agent such as chlorine dioxide; or a whitening agent such as hydrogen peroxide. The cleaning agent could also be any mixture of these kinds of agents and chemicals.

In a specific embodiment of the invention an oral care appliance is provided. The appliance comprises a cartridge interface configured to form a detachable connection with a cartridge; a control means configured to: authorize the operation of the oral care appliance based upon receiving a specific information from a configuration module of the cartridge; and adjust the operations of the oral care appliance in relation to said specific information. The specific information relates to an oral care agent contained in the cartridge. The cartridge interface can be shaped to form a detachable connection with a cartridge.

According to specific embodiments of the invention, the control means comprises at least one of a microprocessor, a micro-controller, a memory module, a communication module, a user interface module, a timer, a counter, a monitoring means, a clock, a user identification module or a combination thereof. The control means can be a controller storing instructions to execute the methods disclosed herein. The instructions can be stored on computer-readable media in the oral care appliance.

According to specific embodiments of the invention, the communication module comprises an NFC reader.

According to specific embodiments of the invention, the control means is configured to identify a user of the oral care appliance.

According to specific embodiments of the invention, the control means is configured to authorize the operation of the oral care appliance by including a step of validating a unique identifier of the cartridge to authenticate the cartridge.

Specific embodiments of the invention provide a method performed by a configuration module of a cartridge for use with an oral care appliance. The method comprises initiating communication with the oral care appliance thereby sending a unique identifier of the cartridge to the oral care appliance; and sending a specific information to the oral care appliance.

The specific information relates to an oral care agent contained in the cartridge and allows an adjustment of the operations of the oral care appliance.

According to specific embodiments of the invention, the configuration module allows authentication of the cartridge by the oral care appliance and the operation of the oral care appliance in relation to only certain authenticated cartridges.

According to specific embodiments of the invention, the configuration module is configured to store at least the unique identifier of the cartridge and the specific information.

According to specific embodiments of the invention, the configuration module allows recording of at least one of filling state of the cartridge, amount of the oral care agent used from the cartridge, number of uses of the cartridge, or a combination thereof.

According to specific embodiments of the invention, the unique identifier comprises an encrypted signature. Encryption of the unique identifier can be done using encryption protocols such as AES-256, AES-128 or other protocols known to an ordinary person skilled in the art.

According to specific embodiments of the invention, authentication of the cartridge is performed by: sending a first challenge from the configuration module of the cartridge to a control means of the oral care appliance; receiving a first response and a second challenge from the control means of the oral care appliance; verifying the first response corresponding to the first challenge and calculating a second response corresponding to the second challenge; and sending the second response to the control means of the oral care appliance.

According to specific embodiments of the invention, the first response is verified by the configuration module of the cartridge by comparing with the first challenge.

According to specific embodiments of the invention, the second response is calculated by using the second challenge and a secret key stored in the configuration module of the cartridge.

According to specific embodiments of the invention, authentication of the cartridge is performed by including a step of validating the unique identifier.

In specific embodiments of the invention a method performed by a control means of an oral care appliance is provided. The method comprises: initiating communication with a configuration module of a cartridge thereby detecting the cartridge; and authorizing the operation of the oral care appliance based upon receiving a specific information relating to an oral care agent contained in the cartridge. The control means is configured to adjust the operations of the oral care appliance in relation to said specific information.

According to specific embodiments of the invention, the control means comprises an NFC reader to communicate with the configuration module.

According to specific embodiments of the invention, the control means is configured to authenticate the cartridge by: receiving a first challenge from the configuration module of the cartridge; sending a first response and a second challenge to the configuration module of the cartridge; receiving a second response from the configuration module of the cartridge; and verifying the second response corresponding to the second challenge.

According to specific embodiments of the invention, the first response is calculated by using the first challenge and a secret key stored in the control means of the oral care appliance.

According to specific embodiments of the invention, the second response is verified by the control means of the oral care appliance by comparing with the second challenge.

According to specific embodiments of the invention, said step of authorizing the operation of the oral care appliance includes a step of validating a unique identifier of the cartridge to authenticate the cartridge.

According to specific embodiments of the invention, the control means uses the specific information to adapt a brushing cycle of the oral care appliance.

According to specific embodiments of the invention, the control means is configured to send an alert to a user to prevent launching of a brushing cycle in case of absence of the cartridge or detection of a counterfeit cartridge.

According to specific embodiments of the invention, communication between the configuration module of the cartridge and the control means of the oral care appliance is encrypted.

Specific embodiments of the invention provide an economic solution by enabling use of the same oral care appliance for multiple users. The improved oral care appliance having better connection arrangement(s) and disconnection arrangement(s) enables several users to use their specific/respective cartridges in the oral care appliance at different point of time. Different users or members of the same family can connect their individual cartridges to the same oral care appliance at different point of time to authorize and adjust the operation(s) of the oral care appliance in relation to the specific information and/or any other information corresponding to a specific user.

Specific embodiments of the invention adapt at least one brushing cycle according to the preferences/clinical requirements of a specific user and/or the specific information relating to the oral care agent contained in the cartridge. Furthermore, the oral care appliance is configured to identify a particular user and adapt the brushing cycle automatically.

Specific embodiments of the invention adjust the operations of the oral care appliance by adapting the brushing cycle. This can be achieved by either defining or modifying at least one operational characteristic of the brushing cycle in relation to the specific information.

Specific embodiments of the invention precisely control the amount/composition of the oral care agent, for example, dentifrice or water, thereby causing adequate cleaning of user's teeth. Similarly, the user-to-user variation in other parameters such as duration/number of injections of the oral care agent, type of the oral care agent, type of mouthpiece, duration/number of contraction/relaxation phases, contraction/relaxation pressure threshold, any performance indicator(s), any other operational characteristic(s) of the brushing cycle or the technique to supply the oral care agent can be realized to adapt the brushing cycle. This user-to-user variation can be realized automatically or defined by at least one of the user, an operator, a health care professional, at least one default cycle of the oral care appliance, or a combination thereof.

Specific embodiments of the invention allow/authorize the operation of the oral care appliance based upon authentication of the cartridge. This may be realized by making use of the configuration module of the cartridge and the control means of the oral care appliance. Furthermore, it is possible to adjust the operations of the oral care appliance based upon the specific information relating to the oral care agent contained in the cartridge.

Specific embodiments of the invention authenticate the cartridge before starting cleaning operation by the oral care appliance to prevent use of non-validated cartridges or counterfeited cartridges.

One or more of the above-mentioned embodiments/steps of the present invention can be automated completely or partially using one or more of components such as the control means, the configuration module and software.

Various objects, features, aspects and advantages of the present disclosure will become more apparent from the following detailed description, along with the accompanying drawing figures in which like numerals represent like features.

BRIEF DESCRIPTION OF DRAWINGS

FIG. 1C-1J illustrate certain views related to positioning of the configuration module/chip (for example, NFC tag) on the enclosure 40 of the cartridge 4 according to embodiments of the invention.

FIG. 2 illustrates an oral care appliance 6 according to embodiments of the invention.

FIG. 3 illustrates a control means 600 of the oral care appliance 6 according to embodiments of the invention.

DETAILED DESCRIPTION OF THE INVENTION

Aspects of the present invention can be understood by reference to the figures and description set forth herein. However, the following descriptions, and numerous specific details thereof, are given by way of illustration and not of limitation. Many changes and modifications to the specific descriptions may be made without departing from the spirit and scope thereof, and the present invention includes all such modifications. It is to be understood that the embodiments may or may not overlap with each other. Thus, part of one embodiment, or specific embodiments thereof, may or may not fall within the ambit of another, or specific embodiments thereof, and vice versa.

This disclosure is generally drawn, inter alia, to appliances, systems, and methods to maintain oral care health and hygiene.

Throughout the specification, the terms, "tag", "tagging" or the like may refer to the exchange of Near Field Communication (NFC) data in an example in which a communication device enters the proximity of another device. Also, as referred to herein the terms "NFC tag(s)", "NFC card(s)", "radio-frequency identification (RFID) tags", "RFID tag(s)", "RFID card(s)", and the like may be referred to interchangeably as a "tag(s)" or "card(s)".

Figure 1A:
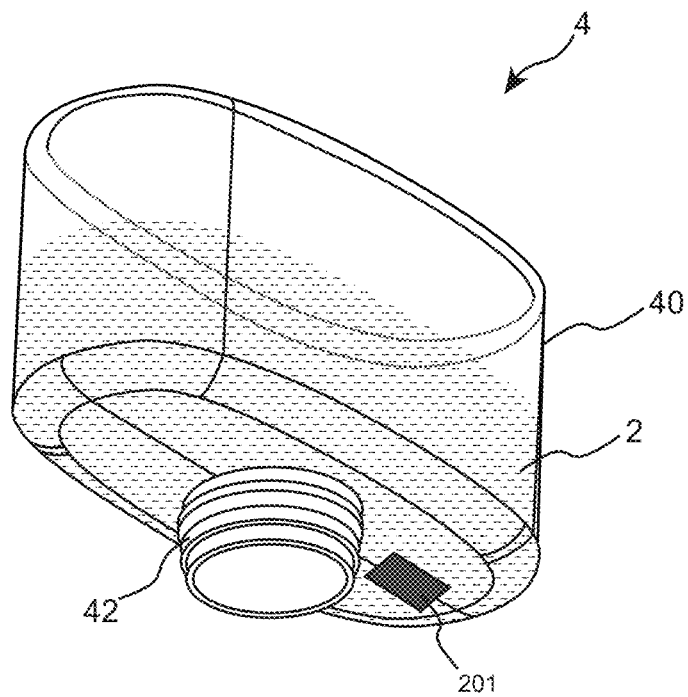
FIGS. 1A-1B illustrate a cartridge 4 according to embodiments of the invention.
Figure 1B:
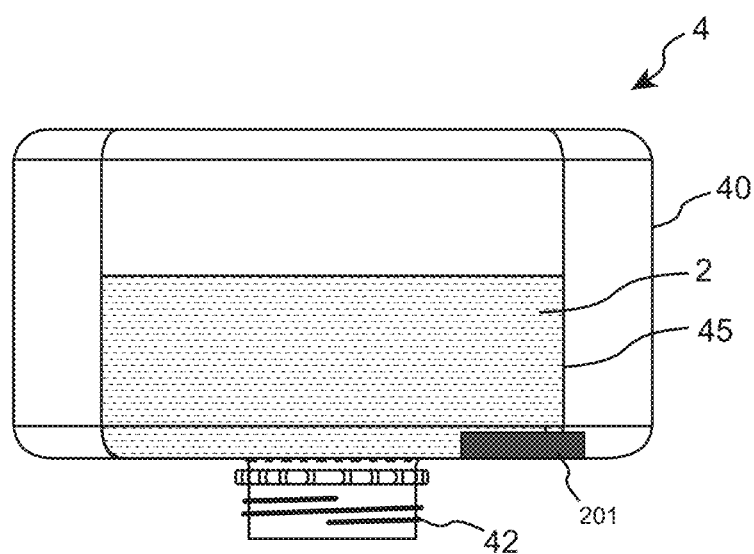
Figure 1C:
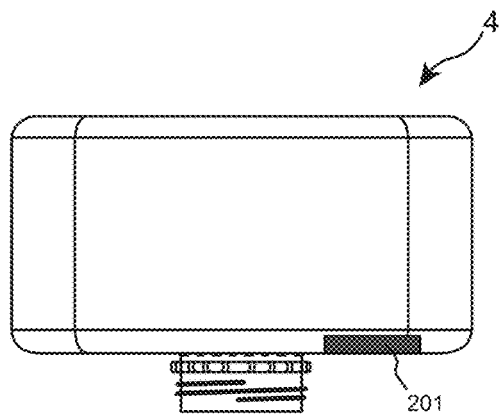
Figure 1D:
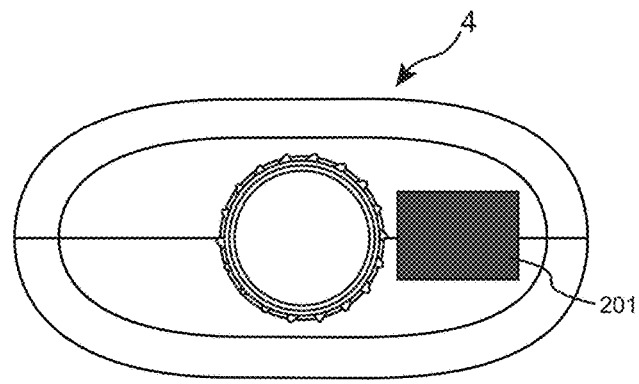
Figure 1E:
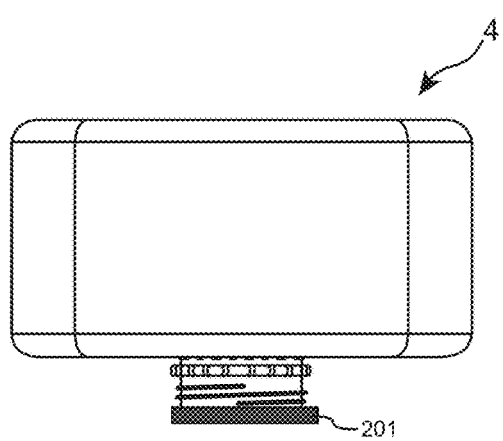
Figure 1F:
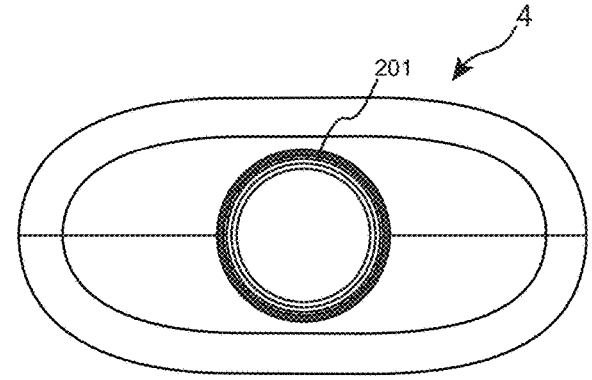
Figure 1G:
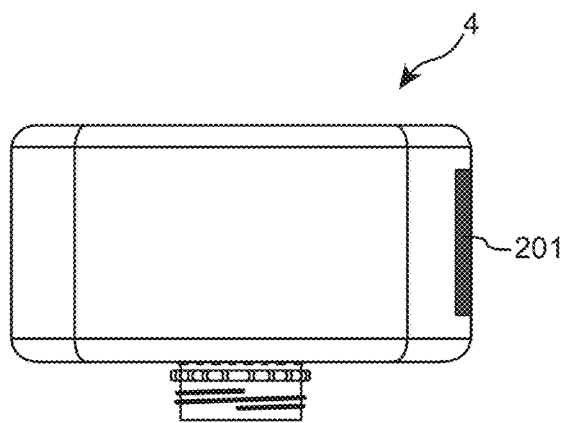
Figure 1H:
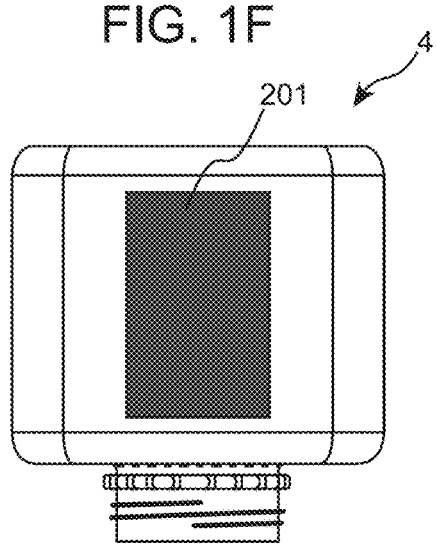

FIGS. 1A-1B illustrate a cartridge 4 for an oral care appliance according to an embodiment of the invention. The cartridge 4 comprises an enclosure 40 and a reservoir 45 containing an oral care agent 2 (for example, dentifrice or any other oral care composition). The oral care agent 2 may be used for cleaning operations to be performed by the oral care appliance. The enclosure 40 is configured to form a detachable connection with the oral care appliance by making use of a connection interface 42 and corresponding connection interface of the oral care appliance. The cartridge 4 further comprises a configuration module 201 to store at least a specific information relating to the oral care agent 2 in order to allow adjustment of the operations of the oral care appliance in relation to said specific information.

According to a specific embodiment of the invention, the configuration module 201 is an electronic chip configured to store at least the specific information relating to the oral care agent 2. Further, the configuration module 201 has wireless or wired communication capability to communicate and exchange information securely with the oral care appliance. For example, the configuration module 201 may comprise an NFC card or tag having a wireless near field communication interface and an electronic storage (e.g., an electronic memory) configured to store at least the specific information relating to the oral care agent 2.

According to specific embodiments of the invention, at least a portion of the enclosure 40 is rigid, i.e. is made up of a rigid material. In one example, the enclosure 40 is made up of hard material selected from, but not limited to, PET, plastic, Acrylonitrile butadiene styrene (ABS), PVC (polyvinyl chloride), a high-density polyethylene polymer or other such similar material known to a person skilled in the art. Advantageously, the enclosure 40 of the cartridge 4 has a symmetrical shape to allow detachable connection with corresponding connection interface of the oral care appliance. The symmetrical shape of the enclosure 40 may allow plugging of the cartridge 4 to corresponding connection interface of the oral care appliance regardless of the direction of the cartridge 4. In one example, the shape of the enclosure 40 is selected from, but not limited to, circular, oval, rectangular, square, oblong or the like, when viewed from the top in a two-dimensional plane. In another specific example, the shape of the enclosure 40 is oblong as shown in FIG. 1A. The shape of the enclosure 40 can be selected to fit the design of the oral care appliance or corresponding connection/cartridge interface of the oral care appliance to facilitate the plugging of the cartridge 4.

According to specific embodiments of the invention, the oral care agent 2 can be selected from a fluid, a solid, a powder, a gel, or a combination thereof. As an example, the oral care agent 2 can be selected from at least one of potassium nitrate, other potassium salts, citric acid, citrates, strontium chloride, sodium fluoride, stannous fluoride, therapeutics agents, abrasive particles, enzymes, pH regulator, fluoride, or a combination thereof.

According to specific embodiments of the invention, the cartridge 4 may be selected from, but not limited to, a flexible container, a dentifrice tube, a sachet or other material known to the person skilled in the art.

According to specific embodiments of the invention, the configuration module 201 of the cartridge 4 is specifically arranged to communicate in accordance with the NFC standard for short range communication. The configuration module 201 may comprise an NFC tag. In one specific example, the NFC tag comprises a wireless identification chip that contains a memory to store at least a unique identifier to authenticate the cartridge 4 and allow the operation of the oral care appliance upon authentication of the cartridge 4. The NFC tag further comprises an antenna that transmits and/or receives the information.

According to embodiments of the invention, FIGS. 1C to 1J illustrate positioning of the configuration module/chip (for example, NFC tag) on the enclosure 40 of the cartridge 4. The antenna of the NFC tag can be positioned anywhere, as long as the antenna is not too far from the chip. Furthermore, the shape and position of the NFC tag can be adapted according to the shape and position of the corresponding NFC reader on the oral care appliance so as to enable communication between the NFC tag and corresponding NFC reader.

According to specific embodiments of the invention, the configuration module 201 is configured to store the unique identifier to allow authentication of the cartridge 4 by the oral care appliance and the operation of the oral care appliance in relation to only certain authenticated cartridges. The unique identifier may comprise an encrypted signature for authentication of the cartridge 4. In some embodiments, authentication of the cartridge 4 is performed by including a step of validating the unique identifier. The unique identifier depicts information regarding the supplier or manufacturer of the cartridge 4, hence validation of the unique identifier allows validation of presence of the cartridge 4 and authentication of the cartridge 4 (being a non-counterfeit cartridge).

According to specific embodiments of the invention, the specific information stored in the configuration module 201 comprises at least one of type, viscosity, flavour, colour, composition, concentration, recommended dosage, function, mixing parameters, or expiry date of the oral care agent 2. The specific information regarding the function of the oral care agent 2 can be at least one of bleaching, treating gum sensibility, desensitizing and combinations thereof. The specific information about the viscosity and/or mixing parameters of the oral care agent 2 allows the oral care appliance to ensure a good ratio/mixing of the oral care agent 2 and diluting/neutral liquid (for example, water) which further helps in maintaining general flow characteristics of the oral care agent 2 with solid particles, heterogeneous fluids, multi-phase mix, fluid, gel or combination thereof. Further, the specific information may contain any such information (for example, temperature) related to use of the oral care agent 2 in a certain manner.

According to specific embodiments of the invention, the specific information can be used to adapt a brushing cycle of the oral care appliance. The brushing cycle is operated according to a plurality of operational characteristics/parameters. These operational characteristics can vary depending on operating principle of the oral care appliance, type of the oral care agent 2 or a mouthpiece or any other components/parts associated with the oral care appliance. In other words, the specific information comprises certain values of these operational characteristics/parameters to adapt the brushing cycle accordingly. Therefore, it is possible to adapt at least one brushing cycle by either defining or modifying at least one operational characteristic of the brushing cycle. In a specific example, the brushing cycle comprises at least one contraction phase of the mouthpiece and at least one relaxation phase of the mouthpiece. The specific information relating to the oral care agent 2 may comprise at least one of injection time, pressure thresholds, number of contractions/relaxations, number of injections or injection volume, etc. In another example, the specific information may correspond to other operational characteristics/parameters such as, but not limited to, duration of the brushing cycle, amplitude of the contractions/relaxations, number and amplitude of vibrations in case of a vibrating brushing tip, pressure applied on teeth/gum, moments of injection interruptions, certain type(s) of mouthpiece suitable for the oral care agent 2, etc.

According to specific embodiments of the invention (as explained later in greater detail with respect to FIG. 6), the configuration module 201 is configured to send a data frame containing the specific information relating to the oral care agent 2.

According to specific embodiments of the invention, the configuration module 201 also allows recording of at least one of filling state of the cartridge 4, amount of the oral care agent used from the cartridge 4, number of uses of the cartridge 4, or a combination thereof. This information can either be stored in a memory module of the oral care appliance and/or automatically transmitted over the internet for commercial usage, such as ordering new cartridges or maintenance of the device. This information can also be directly transmitted to the user via a dedicated smart-phone application and an offline network such as Bluetooth or NFC. The configuration module 201 can be configured to utilize one or more communication protocols (e.g. Wi-Fi, Bluetooth, wireless USB etc.).

According to specific embodiments of the invention as shown in FIG. 2, an oral care appliance 6 is disclosed. The oral care appliance 6 comprises a cartridge interface 62 configured to form a detachable connection with the cartridge 4. The oral care appliance 6 further comprises a control means 600 configured to authorize the operation of the oral care appliance 6 based upon receiving the specific information from the configuration module 201 of the cartridge 4, wherein the specific information relates to the oral care agent 2 contained in the cartridge 4. The control means 600 is further configured to adjust the operations of the oral care appliance 6 in relation to said specific information.

The control means 600 may comprise a microprocessor 610, a memory module 620, a communication module 630, a user interface module 640, a timer 650, a counter 660, a monitoring means 670, a clock 680, a user identification module 690 or a combination thereof (FIG. 3). The control means 600 may comprise one or more microprocessors 610 in communication with one or more memory modules 620. Any other processor-based device such as an application specific processor or a micro-controller can also be used in place of microprocessor 610 to perform the similar function(s). The memory module 620 contains a set of instructions that affect operation of the microprocessor 610. The memory module 620 may be erasable/writable non-volatile memory, such as flash memory, dynamic volatile memory, or other suitable memory including replaceable memory media, or combinations thereof. The monitoring means 670 may further comprise sensor(s) configured to monitor values of one or more of the following, but not limited to, performance indicator(s) of the oral care appliance 6, pressure, amount/volume, temperature, pH value, flow, etc. In a specific example, pressure difference between the components of the oral care appliance 6 is monitored. In another specific example, amount/volume of the oral care agent being injected/supplied through a connection assembly of the oral care appliance 6 into a mouthpiece is monitored. Therefore, the control means 600 can be configured to monitor one or more operational characteristics of the brushing cycle.

In some embodiments, the communication module 630 is configured to enable the communication with external networks, a user's smartphone, component(s) of the oral care appliance 6, an online source, a health care service provider, etc. Based on communication between the configuration module 201 and the communication module 630, the oral care appliance 6 detects the cartridge 4 and obtains the specific information regarding the oral care agent 2 to be used in the oral care appliance 6. In one specific example, the communication module 630 may comprise an NFC reader capable of communicating with corresponding NFC tag on the cartridge 4. The NFC reader processes (e.g. decodes, de-encapsulates, etc.) the data transmitted from corresponding NFC tag on the cartridge 4. Furthermore, the NFC reader can be provided on the handle, on a charging station, or on any other suitable position on the oral care appliance 6. It is already known that NFC data communication enables NFC devices to communicate with each other and communicate with multiple passive tags at the same time.

According to specific embodiments of the invention, the control means 600 can be configured to authorize the operation of the oral care appliance 6 by including a step of validating the unique identifier of the cartridge 4 in order to authenticate the cartridge 4.

According to specific embodiments of the invention, the control means 600 can be configured to identify a user of the oral care appliance 6. In one example, the user can either be identified by utilizing the user interface module 640 or the communication module 630 of the oral care appliance 6. For example, the communication module 630 may comprise of at least one of an NFC chip, a Bluetooth module or a Wi-Fi module. The function(s) of the user identification module 690 may be performed by a software or a combination of the software and hardware component(s) of the oral care appliance 6. In another specific example, a smartphone application can be used to give a command to the oral care appliance 6 by communicating with the control means 600 and adapt the brushing cycle accordingly.

According to specific embodiments of the invention, the control means 600 can be configured to authorize and adjust the operation(s) of the oral care appliance 6 based on identifying the user and receiving the specific information relating to the oral care agent 2. In other words, a user profile combined with the specific information relating to the oral care agent 2 allows adjustment of the operations of the oral care appliance 6. For example, if the user is a child with good oral health and the cartridge plugged contains an adult therapeutic solution, the device can detect this incompatibility and send an alert to the user. As another example, the maximum quantity of fluoride injected for a child should be lower than the one suitable for an adult. Therefore, identification of the user and the specific information relating to the oral care agent 2 allows monitoring of the quantity of fluoride ingested by the user. If the user ingests too much fluoride in a certain day, the injection can be blocked or the user can be required to change the cartridge containing the oral care agent/oral care composition (for example to a fluoride-free composition). On the other hand, if the user has not ingested enough fluoride (for example, to prevent cavities) the amount of the oral care agent/oral care composition injected can be increased. This also works for active agents such as bleaching particles, therapeutics agents, etc.

According to specific embodiments of the invention, the control means 600 is configured to store the user profile in the memory module 620, wherein the user profile comprises at least one of particulars of the user, a record of previous brushing events performed by the user, or a combination thereof. The user profile may also comprise information corresponding to parameters, such as, but not limited to, the user's physical characteristics, the user's medical/dental record, the user's saliva analysis results, a log of pressure readings inside the user's mouth, or a combination thereof. In a specific example, the oral care appliance 6 may launch a softer cycle and adapt the brushing cycle accordingly if the user is a child. In another specific example, the pressure inside the user's mouth is recorded so as to adapt the brushing cycle if the pressure does not reach the threshold value due to the mouth shape of the user or any other physical characteristic(s) of the user.

According to specific embodiments of the invention, the control means 600 prevents the use of a counterfeit cartridge thereby also preventing use of an inappropriate oral care agent 2 that can endanger health of a user or cause inefficient operation of the oral care appliance 6. Thus, the control means 600 is configured to prevent launching of a brushing cycle in case of absence of the cartridge 4 or detection of a non-validated/counterfeit cartridge.

According to specific embodiments of the invention, the control means 600 can be configured to send an alert to a user to prevent launching of a brushing cycle in case of absence of the cartridge 4 or detection of a counterfeit cartridge. For example, the alert can be transmitted via a LED, a vibrator in handle of the oral care appliance 6, a notification on the user's smartphone or any other interface.

According to specific embodiments of the invention, the control means 600 can be configured to use the specific information obtained from the configuration module 201 of the cartridge 4 to adjust the operations of the oral care appliance 6. In one specific example, this can be achieved by adapting a brushing cycle of the oral care appliance 6.

According to specific embodiments of the invention, a method performed by the configuration module 201 of the cartridge 4 is disclosed. The cartridge 4 is configured for use with the oral care appliance 6. The method comprises initiating communication with the oral care appliance 6 thereby sending the unique identifier of the cartridge 4 to the oral care appliance 6 and sending the specific information to the oral care appliance 6, wherein the specific information relates to the oral care agent 2 contained in the cartridge 4 and allows an adjustment of the operations of the oral care appliance 6.

According to specific embodiments of the invention, the configuration module 201 of the cartridge 4 allows authentication of the cartridge by the oral care appliance 6 and the operation of the oral care appliance 6 in relation to only certain authenticated cartridges.

According to specific embodiments of the invention, authentication of the cartridge 4 is performed by sending a first challenge (i.e. a first random challenge number) from the configuration module 201 of the cartridge 4 to the control means 600 of the oral care appliance 6; receiving a first response and a second challenge (i.e. a second random challenge number) from the control means 600 of the oral care appliance 6; verifying the first response corresponding to the first challenge and calculating a second response corresponding to the second challenge; and sending the second response to the control means 600 of the oral care appliance 6.

According to specific embodiments of the invention, a method performed by the control means 600 of the oral care appliance 6 is disclosed. The method comprises initiating communication with the configuration module 201 of the cartridge 4 thereby detecting the cartridge 4; and authorizing the operation of the oral care appliance 6 based upon receiving the specific information relating to the oral care agent 2 contained in the cartridge 4. The control means 600 is configured to adjust the operations of the oral care appliance 6 in relation to the specific information received from the cartridge 4.

According to specific embodiments of the invention, the control means 600 of the oral care appliance 6 is configured to authenticate the cartridge 4 by receiving the first challenge from the configuration module 201 of the cartridge 4; sending the first response and the second challenge to the configuration module 201 of the cartridge 4; receiving the second response from the configuration module 201 of the cartridge 4; and verifying the second response corresponding to the second challenge.

According to specific embodiments of the invention, the first response is calculated by the control means 600 by using the first challenge and a secret key stored in the control means 600 of the oral care appliance 6. Similarly, the second response is calculated by the configuration module 201 by using the second challenge and a secret key stored in the configuration module 201 of the cartridge 4.

According to specific embodiments of the invention, verification of the first response is done by the configuration module 201 of the cartridge 4 by comparing with the first challenge. Similarly, verification of the second response is done by the control means 600 of the oral care appliance 6 by comparing with the second challenge.

Figure 4:
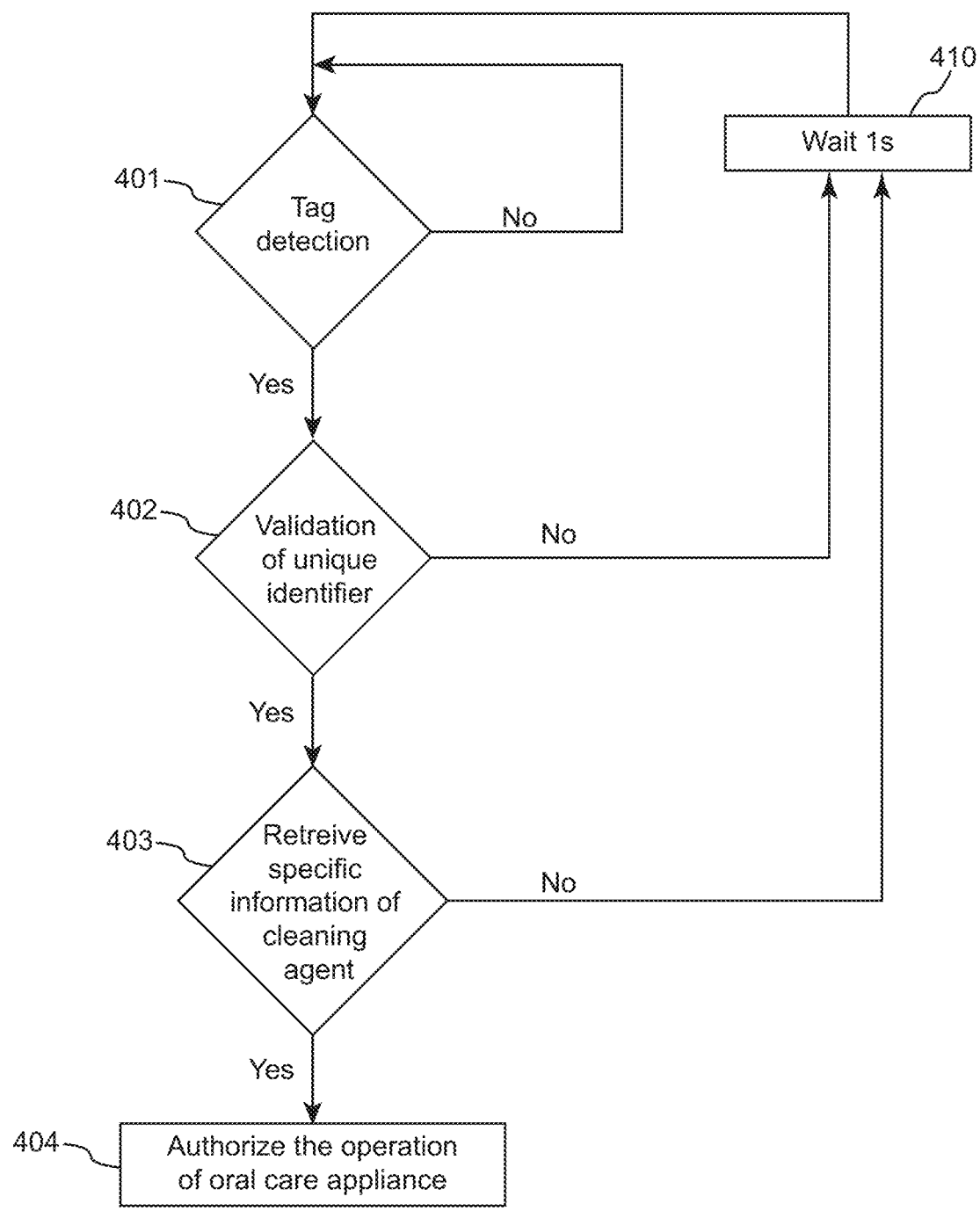
FIG. 4 schematically shows an example flow diagram to perform authentication of the cartridge 4 for use with the oral care appliance 6 according to embodiments of the invention.

FIG. 4 schematically shows an example flow diagram to perform authentication of the cartridge 4 for use with the oral care appliance 6. The flow may include one or more operations, actions, or functions as illustrated by one or more of blocks/steps 401, 402, 403, 404, or 410. Although illustrated as discrete blocks, various blocks may be divided into additional blocks, combined into fewer blocks, reordered into a different sequence or eliminated, depending on the desired implementation. In some further examples, the various described blocks may be implemented as a parallel process instead of a sequential process, or as a combination thereof.

At block 401, the control means 600 of the oral care appliance 6 and the configuration module 201 of the cartridge 4 initiate communication with each other and detection of the NFC tag/configuration module 201 takes place. In case the tag/configuration module 201 is not detected, the process starts again at 401. Further, the configuration module 201 of the cartridge 4 sends the unique identifier of the cartridge 4 to the control means 600 of the oral care appliance 6 for authentication of the cartridge 4. In some embodiments, the configuration module 201 is configured to store the unique identifier that may be used for authentication of the cartridge 4. In some embodiments, this communication can take place via various types of wireless technologies, such as, but not limited to, RFID, Bluetooth, Bluetooth Low Energy, Wi-Fi connections, Zigbee, Z-Wave, and other such technologies. In some other embodiments, this communication is encrypted using cryptographic protocols such as AES-256 or AES-128.

At block 402, the oral care appliance 6 validates the unique identifier to authenticate the cartridge 4. The step of validation of the unique identifier may take place by using three-pass encryption (as explained in greater detail with respect to FIG. 5). If validation of the unique identifier at block 402 fails, the process starts again from the beginning after a 1 second delay at block 410.

At block 403, the specific information relating to the oral care agent 2 contained in the cartridge 4 can be received/retrieved from the configuration module 201 of the cartridge 4 after validation of the unique identifier of the cartridge 4 by the oral care appliance 6. In case no specific information has been received by the oral care appliance 6 at block 403, the process starts again from the beginning after a 1 second delay at block 410. The delay used in block 410 can be longer or shorter than 1 second so long as time is given for the system to reinitialize and prepare for the resumed execution of step 401.

At block 404, the operation of the oral care appliance 6 is authorized by the control means 600 of the oral care appliance 6 based on the specific information received at block 403. The control means 600 of the oral care appliance 6 can be configured to adjust the operations of the oral care appliance 6 based on the specific information.

According to specific embodiments of the invention, validation of the unique identifier is performed to authenticate the cartridge 4. Once the unique identifier is validated at block 402 (FIG. 4), the control means 600 of the oral care appliance 6 receives the specific information relating to the oral care agent 2 (as shown in block 403 of FIG. 4) in order to allow/authorize the operation of the oral care appliance 6 (as shown in block 404 of FIG. 4) and adjust the operations of the oral care appliance 6 in relation to said specific information.

Figure 5:
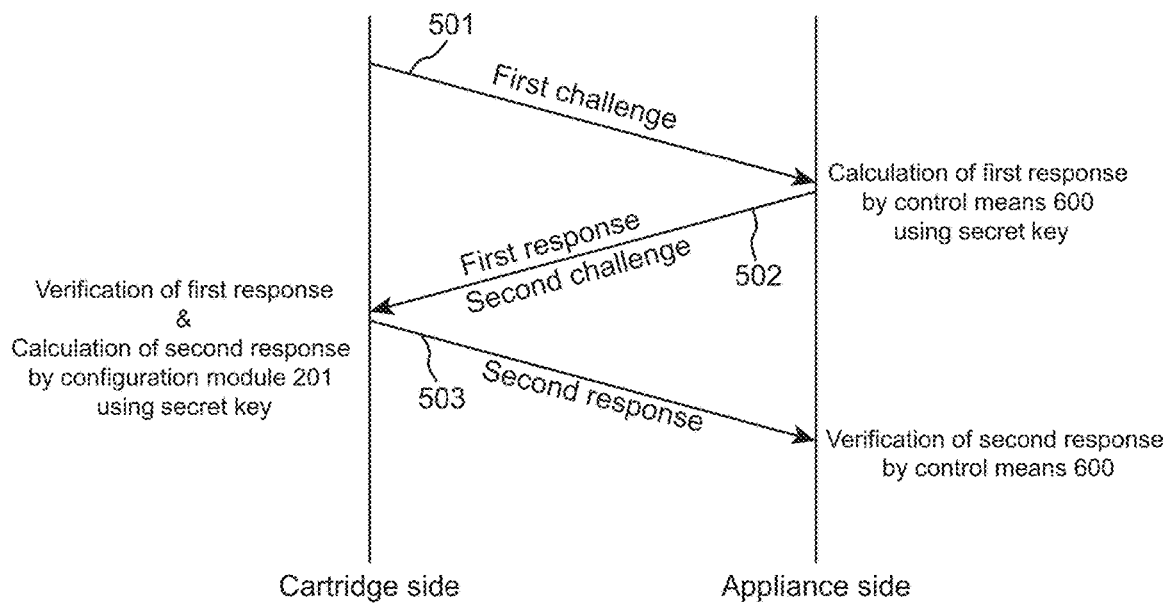
FIG. 5 shows three-pass encryption for performing authentication of the cartridge 4 by including a step of validation of the unique identifier by the oral care appliance 6 according to embodiments of the invention.

FIG. 5 shows three-pass encryption for performing authentication of the cartridge 4 by including a step of validation of the unique identifier by the oral care appliance 6.

At step 501, the configuration module 201 of the cartridge 4 sends the first challenge to the control means 600 of the oral care appliance 6 (Pass one).

After receiving the first challenge from the configuration module 201 of the cartridge 4, the control means 600 of the oral care appliance 6 calculates the first response corresponding to the first challenge. The calculation of the first response is done by the control means 600 by using a secret key stored in the memory module 620 of the oral care appliance 6.

At step 502, the control means 600 of the oral care appliance 6 transmits the first response along with the second challenge to the configuration module 201 of the cartridge 4 (Pass Two).

After receiving the first response and the second challenge from the control means 600 of the oral care appliance 6, the configuration module 201 of the cartridge 4 verifies the first response by comparing with its own challenge (i.e the first challenge) and calculates the second response corresponding to the second challenge. The calculation of the second response is done by the configuration module 201 by using a secret key stored in the configuration module 201 of the cartridge 4.

At step 503, the configuration module 201 of the cartridge 4 transmits the second response to the control means 600 of the oral care appliance 6 (Pass Three).

The control means 600 of the oral care appliance 6 verifies the second response received from the configuration module 201 of the cartridge 4 by comparing with its own challenge (i.e the second challenge) and authentication of the cartridge 4 takes place.

According to specific embodiments of the invention, after the receipt of the first challenge from the configuration module 201 of the cartridge 4, the communication between the configuration module 201 of the cartridge 4 and the control means 600 of the oral care appliance 6 is encrypted. Various encryption protocols such as AES-256, AES-128 or other protocols known to an ordinary person skilled in the art may be used.

Figure 6:
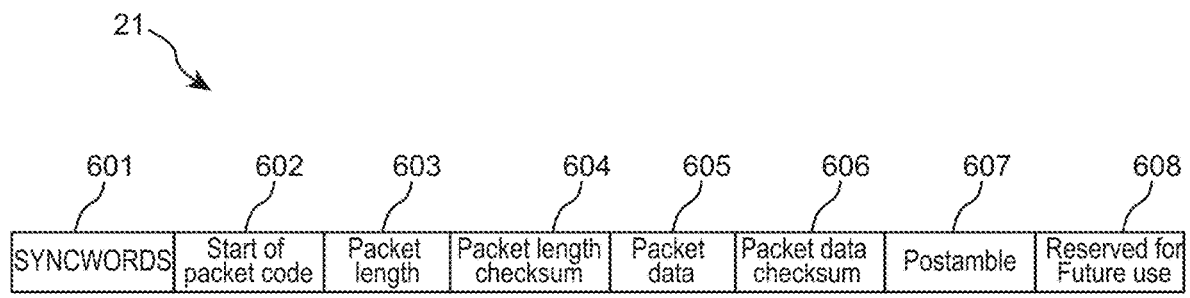
FIG. 6 shows an exemplary data frame 21 containing specific information relating to the oral care agent 2 to be used in the oral care appliance 6 according to embodiments of the invention.

According to an embodiment of the invention, the specific information can be used to adjust the operations of the oral care appliance 6. FIG. 6 shows an exemplary data frame 21 containing the specific information relating to the oral care agent 2 to be used in the oral care appliance 6.

In some embodiments, the configuration module 201 of the cartridge 4 is configured to send the specific information to the control means 600 in a single data frame or multiple data frames.

The exemplary data frame 21 comprises: [SYNCWORD] 601—[Start of Packet Code] 602—[Packet Length] 603—[Packet Length Checksum] 604—[Packet Data] 605—[Packet Data Checksum] 606—[Postamble] 607—[Reserved for Future Use] 608.

The Packet Data 605 particularly comprises 1 byte of data regarding the flavour i.e. from 0-255 which means 256 possibilities, 1 byte of data each for colour, composition, intended function (such as bleaching, treating gum sensibility, desensitizing, tartar control, etc.) and 3 bytes of data for brushing cycle adaptation (which depends on various parameters such as, but not limited to, injection time, pressure thresholds, number of contractions/relaxations, number of injections or injection volume, contractions/relaxations in case of a vibrating brushing tip, pressure applied on teeth/gum, moments of injection interruptions, etc.). Further, the data frame may include few optional bytes for future use (say 4 to 8 bytes) in order to retain the possibility for additional data related to the oral care agent 2.

It is to be noted that one cartridge is being considered for the sake of easy explanation and clarity in above description. However, the implementation of specific embodiments of the present invention can easily be extended to more than one cartridge containing active composition or neutral solution. In one specific example, multiple cartridges can be arranged to have a mixing effect in the oral care appliance 6.

It will be appreciated that the above description has described and illustrated specific arrangements of different modules, and processors. However, it is apparent that the description is intended to cover any and all variations of various embodiments, examples and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The invention claimed is:

1. A cartridge for an oral care appliance, comprising:
an enclosure shaped to form a detachable connection with the oral care appliance when the cartridge is connected to the oral care appliance;
an oral care agent contained in the cartridge;
a configuration module that stores a specific information relating to the oral care agent in order to allow an adjustment of the operations of the oral care appliance in relation to said specific information; and
wherein the specific information comprises at least one of: (i) an injection time for the oral care agent; (ii) a pressure threshold for the oral care appliance; (iii) a number of contractions or relaxations for the oral care appliance; (iv) a number of injections of the oral care agent; and (v) an injection volume of the oral care agent.

2. The cartridge according to claim 1, wherein the configuration module comprises an NFC tag.

3. The cartridge according to claim 1, wherein the configuration module further includes a unique identifier to authenticate the cartridge and allow the operation of the oral care appliance upon authentication of the cartridge.

4. The cartridge according to claim 1, wherein the specific information comprises at least one of type, viscosity, flavour, colour, composition, concentration, recommended dosage, function, mixing parameters, or expiry date of the oral care agent.

5. The cartridge according to claim 1, wherein the specific information is used to adapt a brushing cycle of the oral care appliance.

6. A method performed by a configuration module of a cartridge for use with an oral care appliance, the method comprising:
initiating communication with the oral care appliance;
sending a unique identifier of the cartridge to the oral care appliance;
sending a specific information to the oral care appliance, wherein the specific information: (i) relates to an oral care agent contained in the cartridge; and (ii) adjusts an operation of the oral care appliance based on the specific information; and
wherein the specific information comprises at least one of: (i) an injection time for the oral care agent; (ii) a pressure threshold for the oral care appliance; (iii) a number of contractions or relaxations for the oral care appliance; (iv) a number of injections of the oral care agent; and (v) an injection volume of the oral care agent.

7. The method according to claim 6, wherein the configuration module allows authentication of the cartridge by the oral care appliance and the operation of the oral care appliance in relation to only certain authenticated cartridges.

8. The method according to claim 6, wherein the configuration module comprises an NFC tag.

9. The method according to claim 6, wherein the configuration module stores the unique identifier of the cartridge and the specific information.

10. The method according to claim 6, wherein the configuration module allows recording of at least one of filling state of the cartridge, amount of the oral care agent used from the cartridge, and a number of uses of the cartridge.

11. The method according to claim 6, wherein the unique identifier comprises an encrypted signature.

12. The method according to claim 6, wherein the specific information comprises at least one of type, viscosity, flavour, colour, composition, concentration, recommended dosage, function, mixing parameters, or expiry date of the oral care agent.

13. The method according to claim 6, wherein the specific information is used to adapt a brushing cycle of the oral care appliance.

14. The method according to claim 7, wherein authentication of the cartridge is performed by:
sending a first challenge from the configuration module of the cartridge to a controller of the oral care appliance;
receiving a first response and a second challenge from the controller of the oral care appliance;
verifying the first response corresponding to the first challenge and calculating a second response corresponding to the second challenge; and
sending the second response to the controller of the oral care appliance.

15. The method according to claim 14 wherein the first response is verified by the configuration module of the cartridge by comparing with the first challenge.

16. The method according to claim 14, wherein the second response is calculated by using the second challenge and a secret key stored in the configuration module of the cartridge.

17. The method according to claim 7, wherein authentication of the cartridge is performed by including a step of validating the unique identifier.

18. A method performed by a controller of an oral care appliance, the method comprising:
   initiating communication with a configuration module of a cartridge;
   detecting the cartridge based on the initiating;
   authorizing the operation of the oral care appliance based upon receiving a specific information relating to an oral care agent contained in the cartridge; and
   adjusting the operation of the oral care appliance based on said specific information.

19. The method according to claim 18, wherein the controller comprises an NFC reader to communicate with the configuration module.

20. The method according to claim 18, further comprising authenticating the cartridge by:
   receiving a first challenge from the configuration module of the cartridge;
   sending a first response and a second challenge to the configuration module of the cartridge;
   receiving a second response from the configuration module of the cartridge; and
   verifying the second response corresponding to the second challenge.

21. The method according to claim 20, wherein the first response is calculated by using the first challenge and a secret key stored in the controller of the oral care appliance.

22. The method according to claim 20, wherein the second response is verified by the controller of the oral care appliance by comparing with the second challenge.

23. The method according to claim 18, wherein the step of authorizing the operation of the oral care appliance includes a step of validating a unique identifier of the cartridge to authenticate the cartridge.

24. The method according to claim 18, wherein the controller uses the specific information to adapt a brushing cycle of the oral care appliance.

25. The method according to claim 18, further comprising:
   identify a user of the oral care appliance based on information from the cartridge.

26. The method according to claim 18, further comprising:
   detecting a counterfeit cartridge; and
   sending an alert to a user to prevent launching of a brushing cycle based on the detecting.

* * * * *